United States Patent
Schweizer et al.

(10) Patent No.: US 10,036,439 B2
(45) Date of Patent: Jul. 31, 2018

(54) BRAKE DISK DEVICE FOR A VEHICLE

(71) Applicant: Dr. Ing. h.c. F. Porsche Aktiengesellschaft, Stuttgart (DE)

(72) Inventors: Bernhard Schweizer, Eutingen-Rohrdorf (DE); Adrian Loos, Taunusstein (DE); Michael Bott, Korntal-Muenchingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 132 days.

(21) Appl. No.: 15/148,213

(22) Filed: May 6, 2016

(65) Prior Publication Data

US 2016/0377133 A1    Dec. 29, 2016

(30) Foreign Application Priority Data

Jun. 24, 2015 (DE) .................. 10 2015 110 104

(51) Int. Cl.
*F16D 65/12* (2006.01)
*F16D 65/02* (2006.01)

(52) U.S. Cl.
CPC .... *F16D 65/123* (2013.01); *F16D 2065/1316* (2013.01); *F16D 2065/1344* (2013.01);
(Continued)

(58) Field of Classification Search
CPC ........... F16D 65/123; F16D 2065/1344; F16D 2065/1316; F16D 2065/1356;
(Continued)

(56) References Cited

U.S. PATENT DOCUMENTS 2,410,195 A * 10/1946 Baselt .................. F16D 65/123
                                                164/333
2,745,518 A *  5/1956 Bachman ............. F16D 65/123
                                                188/218 XL
(Continued)

FOREIGN PATENT DOCUMENTS

DE      2728335 A * 1/1978 ............. F16D 65/12
DE      4418889     12/1994
(Continued)

OTHER PUBLICATIONS

German Search Report for German Application No. 102015110104.1 dated Feb. 4, 2016, including partial English language translation.
(Continued)

*Primary Examiner* — Xuan Lan T Nguyen
(74) *Attorney, Agent, or Firm* — RatnerPrestia

(57) ABSTRACT

A brake disk device for a vehicle having an annular brake disk with an encircling outer portion and an encircling inner portion, the inner diameter of which bounds a disk opening, and a brake pot with an annularly encircling edge portion, wherein the brake pot is fastened at the edge portion to the inner portion of the brake disk, wherein the edge portion is of multi-layered design at least in sections and/or is of thickened design in sections, wherein the walls of the edge portion are at least partially in contact, and an inner surface of the edge portion is designed as an additional brake surface.

8 Claims, 3 Drawing Sheets

(52) U.S. Cl.
CPC ............... *F16D 2065/1356* (2013.01); *F16D 2250/0023* (2013.01)

(58) Field of Classification Search
CPC ..... F16D 2250/0023; F16D 2065/1328; F16D 65/128
See application file for complete search history.

(56) References Cited

U.S. PATENT DOCUMENTS

| | | | |
|---|---|---|---|
| 2,769,512 A | | 11/1956 | Tack |
| 3,661,235 A | * | 5/1972 | Harrison ............... F16D 65/123 188/218 XL |
| 3,749,416 A | * | 7/1973 | Asberg ................ B60B 27/0005 188/18 A |
| 4,002,227 A | * | 1/1977 | Simon ................... F16D 65/123 188/218 XL |
| 4,501,346 A | * | 2/1985 | Bogenschutz ........ F16D 65/123 188/218 XL |
| 5,385,216 A | | 1/1995 | Kulczycki |
| 6,035,978 A | | 3/2000 | Metzen |
| 2011/0127125 A1 | * | 6/2011 | Finch, Jr. ................. B61H 5/00 188/218 XL |

FOREIGN PATENT DOCUMENTS

| | | | |
|---|---|---|---|
| DE | 4419757 | | 12/1995 |
| DE | 19652464 | | 6/1998 |
| DE | 10217616 | | 11/2003 |
| DE | 102011101126 B3 | | 10/2012 |
| DE | 102012010875 A1 | | 12/2013 |
| DE | 102013006423 A1 * | | 10/2014 ........... F16D 65/123 |
| DE | 102013106581 A1 * | | 12/2014 ........... F04D 17/16 |
| FR | 2938311 | | 5/2010 |
| GB | 2090636 A * | | 7/1982 ........... F16D 65/123 |

OTHER PUBLICATIONS

Chinese Office Action for Chinese Application No. 201610467167.8, dated Apr. 2, 2018, including Concise Statement of Search Report, 5 pages.

* cited by examiner

US 10,036,439 B2

BRAKE DISK DEVICE FOR A VEHICLE

CROSS-REFERENCE TO RELATED APPLICATIONS

This application claims priority to German Patent Application No. DE 10 2015 110 104.1, filed Jun. 24, 2015, which is incorporated by reference herein in its entirety.

FIELD OF THE INVENTION

The invention relates to a brake disk device for a vehicle and a method for producing a brake disk device.

BACKGROUND OF THE INVENTION

It is known from the prior art that brake disk devices can be of two-part design. Customarily, in the case of two-part systems of this type, a brake disk which has an annular design is provided. The disk opening produced by the ring is closed by a brake pot made of a sheet-metal material. In addition to the basic braking function, namely the service brake, vehicles are frequently additionally equipped with a parking brake, which may also be referred to as a handbrake function. Customarily, said parking brake function is ensured either by means of a separate mechanical solution or by means of a corresponding activation of the service brake function. For example, contact of a brake pad with the brake disk may provide the service brake function and the parking brake function.

However, it may be desirable entirely consciously to provide a mechanical separation between the service brake function and the parking brake function. In order to ensure this, in the case of the known solutions, separate mechanical units are necessary which can ensure a corresponding parking brake function at the respective wheel. For this purpose, additional mechanical devices, and in particular additional components fastened to the respective wheel or to the wheel hub, are necessary, which devices and components can ensure or can avoid the relative movement between the wheel or the wheel hub, on the one hand, and the vehicle, on the other hand, in respect of the parking brake function.

It is desirable, at least partially, to eliminate the disadvantages described above.

SUMMARY OF THE INVENTION

In particular, it is desirable to permit a mechanically separate parking brake function in a cost-effective and simple manner. Described herein is a brake disk device for a vehicle, having an annular brake disk with an encircling outer portion and an encircling inner portion, the inner diameter of which bounds a disk opening, and a brake pot with an annularly encircling edge portion, wherein the brake pot is fastened at the edge portion to the inner portion of the brake disk, wherein the edge portion is of multi-layered design at least in sections and/or is of cold-formed, thickened design in sections, wherein the walls of the edge portion are at least partially in contact, and an inner surface of the edge portion is designed as an additional brake surface.

The brake disk device is produced according to the following steps: arranging a brake pot in a disk opening of a brake disk, forming an edge portion, which is multi-layered at least in sections and/or is thickened in sections, on the brake pot, and fastening the edge portion to an inner portion of the brake disk.

It is provided that the edge portion of the brake disk is of double-walled design at least in sections, wherein the walls of the edge portion are at least partially in contact, and an inner surface of the edge portion is designed as an additional brake surface. According to aspects of the invention, a brake disk device which is of basically two-part construction is therefore provided. Firstly, an annular brake disk with an encircling outer portion and an encircling inner portion, as are basically known, is provided. Such brake disks can be constructed to be as complex as desired and are designed in particular as ventilated or internally ventilated brake disks. According to aspects of the invention, the disk opening formed by the annular design of the brake disk is closed by a brake pot. Said brake pot is in particular provided with the base explained in more detail further on.

The brake pot is formed from a sheet-metal material and is then provided with an additional functionality. The brake pot is formed here from a sheet-metal material, and therefore said brake pot can be produced in particular within the scope of a cold-forming process. Thus, for example, a deep-drawing process and/or a bending process is usable for production of the brake pot.

According to aspects of the invention, the edge portion of the brake pot is of multi-layered design at least in sections and/or is of cold-formed, thickened design in sections. A double-walled design is particularly preferred here. Said multi-layered design in sections and/or thickened design in sections may be formed, for example, in an encircling direction. However, it is preferred if the multi-layered design and/or thickened design in sections of the edge portion is available in a substantially completely encircling manner or entirely completely encircling manner. In the case of a multi-layered design and/or thickened design in sections, the respective walls in said edge portion are formed so as to be in contact or at least partially in contact with one another. This means that force can be transmitted by corresponding contact surfaces between the individual walls of the double-walled or multi-layered design of the edge portion.

On the basis of the multi-layered design and/or thickened design in sections, in accordance with the core concept of the present invention, in the edge portion of the brake pot, said edge portion is mechanically reinforced. Despite the simple and cost-effective production possibility with the aid of a deep-drawing method or similar cold-forming production possibilities, an additional brake functionality is now provided according to aspects of the invention. Thus, in said mechanically reinforced region of the edge portion, the inner surface of said edge portion can now be designed as an additional brake surface. Said additional brake surface is designed here in particular for carrying out a parking brake function.

In the case of a brake disk device according to aspects of the invention, it is now possible to provide a separation of functions which firstly provides a classic service brake as a disk brake system. The parking brake function can be provided by brake shoes which are designed, for example, as a drum brake and correspondingly come to bear against the inner surface, which is designed as an additional brake surface, in the edge portion of the brake pot. This brake pad system on the additional brake surface leads to a parking brake functionality being provided when the vehicle is at a standstill.

In comparison to known solutions, this separate mechanical refinement of the parking brake function can now be provided in a cost-effective and simple manner since, by means of a simple and especially cost-effectively producible mechanical reinforcement of the edge portion, the latter can now provide part of the additional and separately formed parking brake functionality.

The individual components, in particular the brake disk and the brake pot, are designed here preferably as rotationally symmetrical components. An outer portion and an inner portion of the brake disk should be understood here as meaning portions which are either linear or are in the form of an area. Customarily, a brake disk has a defined thickness, and therefore the inner portion and the outer portion can be formed outwardly and inwardly in particular as an area of a cylindrical surface or at least in sections as an area of a cylindrical surface.

According to a further advantage, it can be provided that the edge portion has, at least in sections, a wall which is bent over and is in contact with itself. The design of the edge portion at least in sections in the form of a wall which is bent over and is in contact with itself leads to a further reduction in the outlay on production. The sheet-metal pot can thus preferably be produced as an integral or monolithic component. The multi-layered design and/or thickened design in sections of the edge portion is likewise integral or monolithic here. Furthermore, by means of the corresponding bending over, which takes place in particular in a cold-forming manner, additional mechanical hardening can be obtained by structure changes within the sheet-metal material of the brake pot. Furthermore, by selection of the bending radius, it is possible for a corresponding variation to take place in terms of the size of the contact surface between the two contacting walls. The mechanical stability in the radial direction and torsional rigidity of said edge portion can thereby be adapted or varied.

Furthermore, it is advantageous if, within the scope of the invention, the multi-layered design and/or thickened design in sections of the edge portion is formed by at least one cold-forming step. The use of a cold-forming step, as can be provided, for example, in the form of bending over or deep drawing, leads to a structure change in the metal material of the brake pots in the edge portion. Said structure change may also be referred to as work-hardening, and therefore, in addition to producing the desired final shape of the edge portion, improved mechanical stabilization is thereby provided. Therefore, not only is a reinforced material provided by means of the double-walled structure, but, on the contrary, a mechanical reinforcement of the stabilizing effect is also provided within the material. Of course, combinations of very different cold-forming steps with one another are also conceivable within the scope of the present invention.

A further advantage can be achieved within the scope of the invention if the two walls of an, in particular double-walled, edge portion are connected to each other, in particular in an integrally bonded manner. The use of an integrally bonded connection is expedient in particular whenever the two walls of the edge portion are not formed integrally, but rather separately from each other. For example, the placing of a separate outer ring onto the edge portion as inner ring is conceivable. This can take place, for example, by shrinking on. The two walls are therefore connected to each other by very different possibilities. A form-fitting connection, a frictional connection and/or an integrally bonded connection are thus conceivable. In particular, an integrally bonded connection in the form of a welding method, i.e. a spot welding method or a seam welding method, may provide advantages in the present invention. The corresponding connection prevents a relative movement both in the event of braking forces acting tangentially and also in the event of braking forces acting radially.

A further advantage can be achieved within the scope of the invention if the brake pot has a base which is closed at least in sections. The design of the brake pot with an at least partially closed base provides advantages in respect of the stability. In this way, the torsional rigidity of the brake disk device or of the brake pot is also improved. In particular when the parking brake function is activated, an increased security of sufficient contact of the respective brake shoes against the additional brake surface of the brake pot can thereby be provided. The base extends here preferably radially inward and offset axially in order to close a corresponding pot-like design of the brake pot.

A further advantage can be achieved within the scope of the invention if the additional brake surface has, at least in sections, a machined brake surface and/or a brake pad, in particular fastened in an exchangeable manner. A design of the brake disk device with machined brake surfaces and/or brake pads improves the braking effect of the additional and separately formed parking brake device. The design of the brake surface can therefore be provided, for example, by mechanical machining. It is namely conceivable that, by roughening the surface, increased friction values are provided in order accordingly to improve the parking brake function. The use of a separate brake pad for providing a machined brake surface furthermore makes it possible to carry out maintenance or a repair of a reduced braking performance of the parking brake function in a cost-effective and simple manner.

A further advantage can be achieved within the scope of the invention if the edge portion has an, in particular encircling, flanged edge which extends radially or substantially radially outward and in particular forms a fastening form-fitting connection with the inner portion of the brake disk. If a connection between the inner portion of the brake disk and the edge portion is required in a particularly simple manner, this can be provided by the described flanged edge. A flanged edge should be understood here as meaning in particular a partial portion of the edge portion, which partial portion protrudes radially outward over the rest of the edge portion. A flanged edge is in particular likewise provided by a cold-forming method. The radial extent of the flanged edge outward or theoretically also inward serves to provide a form-fitting connection, which is provided at least in sections, with a correlating surface of the inner portion of the brake disk. This makes it possible to produce the fastening of the brake pot to the brake disk in a cost-effective and simple manner. The design can preferably be provided here by an elastically resilient configuration of the brake pot in the region of the edge portion, but preferably next to the edge portion, and therefore, when the brake pot is pushed into the final position thereof in the disk opening, the entire edge portion can spring radially inward by means of a corresponding spring portion next to the edge portion, and the final position can be achieved by pressing the brake pot in axially. As soon as said final position is achieved in the axial direction, the edge portion will spring back outward into the desired radial position thereof by means of the resilient configuration next thereto and in this manner form the described form-fitting connection between the flanged edge and the inner portion of the brake disk.

The subject matter of the invention is likewise a method for producing a brake disk device according to aspects of the invention. In this case, the following steps are provided:

arranging a brake pot in a disk opening of a brake disk,
forming an edge portion, which is multi-layered at least in sections and/or is thickened in sections, on the brake pot, fastening the edge portion to an inner portion of the brake disk.

The method according to aspects of the invention therefore affords the same advantages as have been explained in detail with regard to a brake disk device according to aspects of the invention. Of course, within the scope of the present invention, the sequence of the described steps of the method can take place substantially freely from one another. For example, the formation of the edge portion which is multi-layered in sections or is double-walled can take place only when the brake pot is already arranged in the disk opening. It is also conceivable for the formation of the edge portion in a double-walled manner to take place even before the brake pot is arranged on the brake disk. Of course, by means of the formation of the multi-layered or double-walled edge portion, the edge portion can also be fastened to the inner section, as is the case, for example, when carrying out a flanging step.

According to an advantageous development of the invention, it can be provided that the edge portion of the brake pot is produced by being bent over. The bending over provides a particularly simple and cost-effective solution for producing the edge portion. In particular, a work-hardening design is likewise involved again here, and therefore the same advantages as already explained further above can correspondingly be achieved.

According to an advantageous development of the invention, it can be provided that a flanged edge is formed on the edge portion for an, in particular form-fitting, fastening to the inner portion of the brake disk. The design of a form-fitting fastening to the inner portion by means of the corresponding flanged edge now makes it possible, both directly and also indirectly by means of the described elastic spring possibility, to provide a simplified and nevertheless highly securely provided fastening of the brake pot to the inner portion of the brake disk.

Further features and details of the invention emerge from the description and the drawings. Of course, features and details which are described in conjunction with the brake disk device according to aspects of the invention also apply in conjunction with the method according to aspects of the invention, and vice versa in each case, and therefore, with regard to the disclosure, reference is always, and can always be, made reciprocally to the individual aspects of the invention.

BRIEF DESCRIPTION OF THE DRAWINGS

Further advantages, features and details of the invention emerge from the description below in which exemplary embodiments of the invention are described in detail with reference to the drawings. The features mentioned in the claims and in the description may be essential to the invention in each case individually by themselves or in any combination. In the drawings:

DETAILED DESCRIPTION OF THE INVENTION

Figure 1:
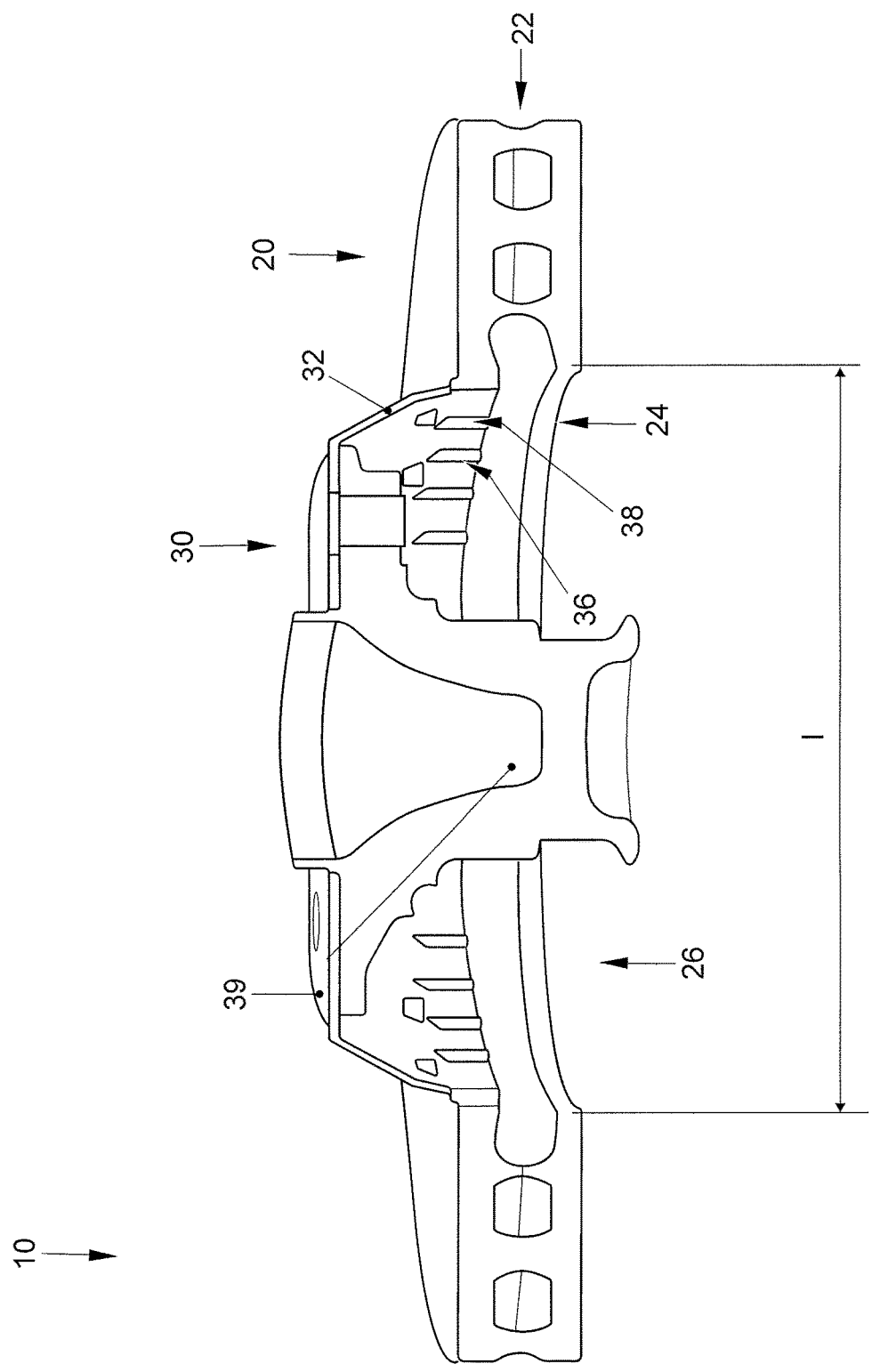
FIG. 1 shows an exemplary illustration of a brake disk device according to aspects of the invention.

FIG. 1 schematically illustrates a brake disk device 10 according to aspects of the invention. The brake disk device 10 is of two-part design with a brake disk 20 and a brake pot 30. The brake disk 20 is of annular design, and therefore a radially outwardly pointing outer portion 22 and a radially inwardly pointing inner portion 24 are formed. This brake disk 20 is an internally ventilated version which has ventilation ducts both in the radial direction and in the axial direction.

A central disk opening 26 is formed by the annular configuration of the brake disk 20. A brake pot 30 which is closed or is substantially closed in the axial direction by a base 39 is inserted here into said disk opening 26. The brake pot 30 extends in the axial direction with the pot walls thereof toward the end thereof, wherein an encircling edge portion 32 is formed at the end thereof. Said edge portion 32 serves for the fastening to the inner portion 24 of the brake disk 20.

As can already be seen in FIG. 1, the inner diameter I of the brake disk 20 is adapted here to the outer diameter of the brake pot 30 in the edge portion 32 thereof in order to be able to obtain the fastening already described. Furthermore, an additional brake surface 38 which can provide a parking brake function is formed on the inner surface 36 of the edge portion 32. One or more brake pads can now be brought in a radially outwardly directed manner into frictional contact with said inner surface 36 as an additional brake surface 38 in order to be able to provide a parking brake function.

In order to avoid or at least to reduce a mechanical deformation of the brake pot 30 and/or an undesirable radial mechanical loading of the brake disk 20, a design, which is mechanically stabilized according to aspects of the invention, of the brake pot 30 is provided in the edge portion 32.

Figure 2:
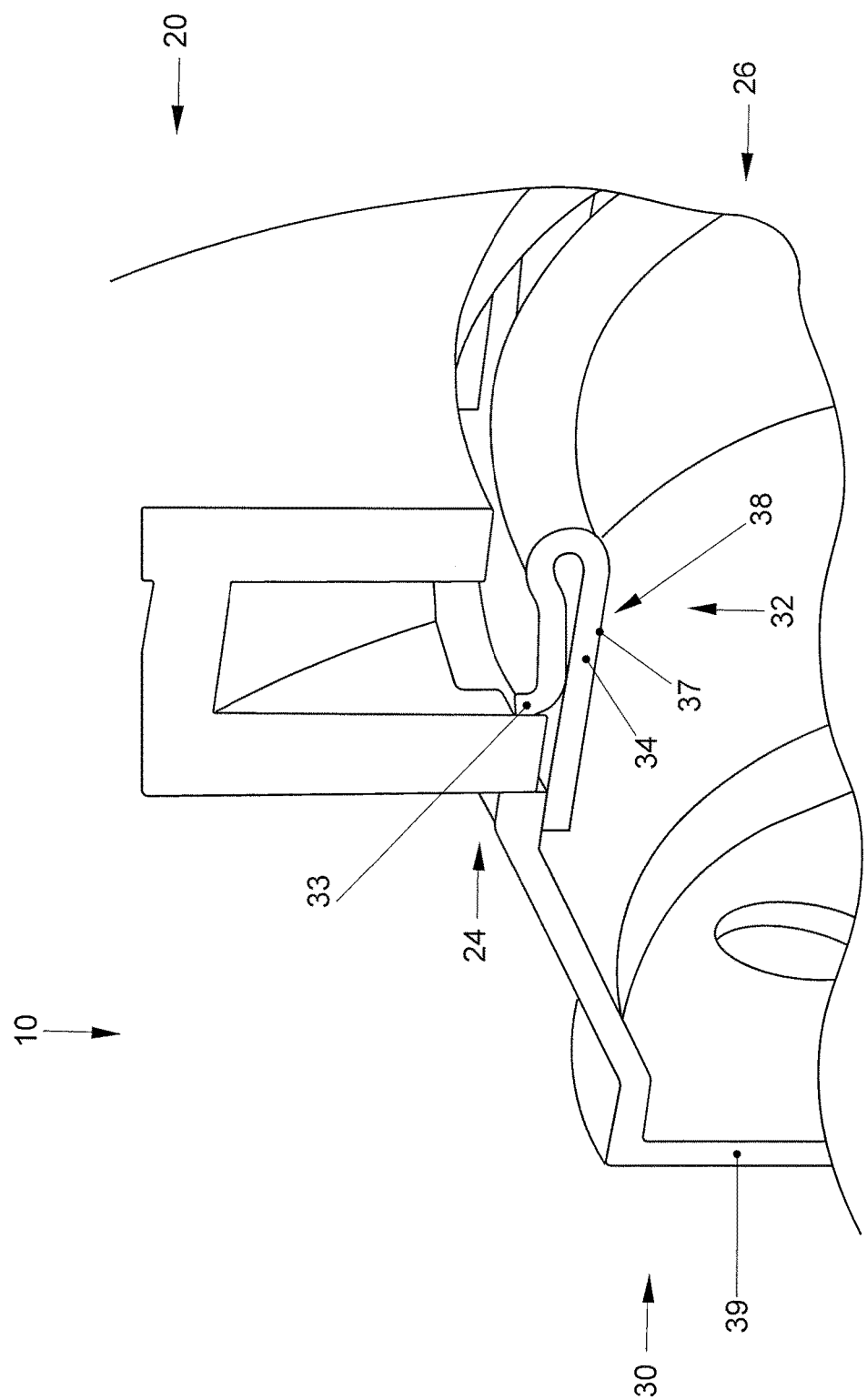
FIG. 2 shows a further embodiment of a brake disk device according to aspects of the invention in detail.

FIG. 2 shows one possibility of such a mechanically stabilizing embodiment of the edge portion 32. Two walls 34 are placed onto each other here in a double-walled manner and are substantially completely in contact in the circumferential direction at least in one portion. A multi-layered design and/or thickened design in sections of the edge portion 32 is basically conceivable, and therefore the double-walled design of the edge portion that is illustrated in FIG. 2 merely constitutes one exemplary embodiment. Said double-walled design has been carried out by bending over the edge portion 32 such that the outer surface of the outer wall 34 comes to lie on the outer surface of the inner wall 34. Said bending over can be provided, for example, by a deep-drawing process. Furthermore, on the inner side 36, the additional brake surface 38 has been mechanically machined here in respect of the brake surface 37 in order even further to improve the braking effect by means of an increased coefficient of friction.

Figure 3:
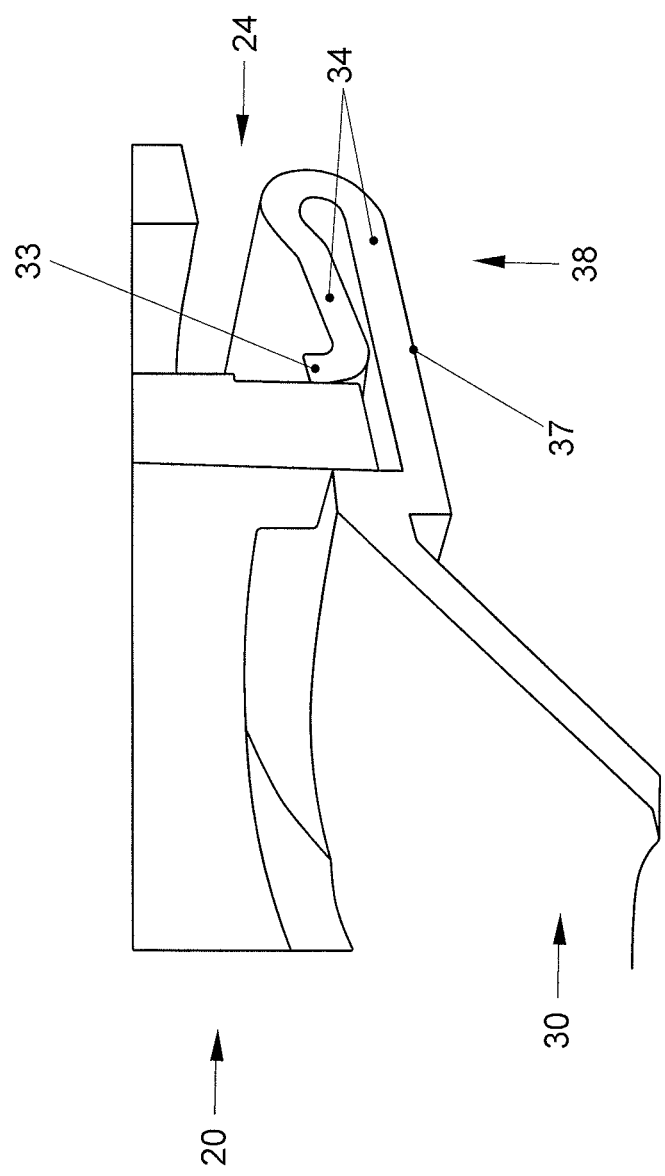
FIG. 3 shows the embodiment of FIG. 2 in a different view.

As can be seen in FIG. 2 and furthermore also in FIG. 3, the edge portion 32 is additionally formed with a flanged edge 33 which here permits a form-fitting engagement or a form-fitting connection with the inner portion 24 of the brake disk 20. A particularly simple and cost-effective fastening of the brake pot 30 thereby takes place via the edge portion 32 thereof to the inner portion 24 of the brake disk 20.

The above explanation of the embodiments describes the present invention exclusively within the scope of examples. Of course, individual features of the embodiments, if technically expedient, can be freely combined with one another without departing from the scope of the present invention.

What is claimed is:

1. A brake disk device for a vehicle comprising:
an annular brake disk with an encircling outer portion and an encircling inner portion, wherein an inner diameter of the encircling inner portion bounds a disk opening, and
a brake pot with an annularly encircling edge portion, wherein the brake pot is fastened at the annularly encircling edge portion to the encircling inner portion of the annular brake disk,
wherein the annularly encircling edge portion is multi-layered at least in sections or is cold-formed and thickened in sections,
wherein an inner surface of the annularly encircling edge portion is an additional brake surface,
wherein the annularly encircling edge portion has, at least in sections, a wall which is bent over and is in contact with itself.

2. The brake disk device as claimed in claim 1, wherein the annularly encircling edge portion has a double-walled design that is formed by at least one cold-forming step.

3. The brake disk device as claimed in claim 2, wherein the two walls of the double-walled annularly encircling edge portion are connected to each other in an integrally bonded manner.

4. The brake disk device as claimed in claim 1, wherein the brake pot has a base which is closed at least in sections.

5. The brake disk device as claimed in claim 1, wherein the additional brake surface has, at least in sections, a machined brake surface.

6. The brake disk device as claimed in claim 1, wherein the annularly encircling edge portion has an encircling flanged edge which extends radially or substantially radially outward and forms a fastening form-fitting connection with the encircling inner portion of the annular brake disk.

7. A method for producing a brake disk device, having the following steps:
arranging a brake pot having an annularly encircling edge portion in a disk opening of an annular brake disk having an encircling outer portion and an encircling inner portion, wherein an inner diameter of the encircling inner portion bounds the disk opening,
forming the annularly encircling edge portion, which is multi-layered at least in sections or is thickened in sections, on the brake pot, wherein the annularly encircling edge portion has, at least in sections, a wall which is bent over and is in contact with itself, and wherein an inner surface of the annularly encircling edge portion is an additional brake surface,
fastening the annularly encircling edge portion to the encircling inner portion of the annular brake disk.

8. The method as claimed in claim 7, wherein a flanged edge is formed on the annularly encircling edge portion for form-fitting fastening to the encircling inner portion of the annular brake disk.

* * * * *